(12) United States Patent
Park et al.

(10) Patent No.: US 12,136,434 B2
(45) Date of Patent: Nov. 5, 2024

(54) APPARATUS AND METHOD FOR GENERATING AUDIO-EMBEDDED IMAGE

(71) Applicant: ELECTRONICS AND TELECOMMUNICATIONS RESEARCH INSTITUTE, Daejeon (KR)

(72) Inventors: Su-Wan Park, Daejeon (KR); Geon-Woo Kim, Daejeon (KR); Seon-Ho Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 406 days.

(21) Appl. No.: 17/668,531

(22) Filed: Feb. 10, 2022

(65) Prior Publication Data

US 2022/0277760 A1     Sep. 1, 2022

(30) Foreign Application Priority Data

Feb. 22, 2021   (KR) .................. 10-2021-0023670
May 18, 2021   (KR) .................. 10-2021-0064301

(51) Int. Cl.
*G06V 10/40*       (2022.01)
*G06V 10/776*      (2022.01)
(Continued)

(52) U.S. Cl.
CPC .............. *G10L 21/10* (2013.01); *G06V 10/40* (2022.01); *G06V 10/776* (2022.01); *G06V 10/82* (2022.01)

(58) Field of Classification Search
CPC ......... G10L 21/10; G10L 25/30; G06V 10/40; G06V 10/776; G06V 10/82; G06V 20/52; G06N 3/045; G06N 3/0475; G06N 3/088
See application file for complete search history.

(56) References Cited

U.S. PATENT DOCUMENTS 8,842,738 B2      9/2014   Hong
10,991,385 B2 *   4/2021   Jansson ................ G10H 1/0033
(Continued)

FOREIGN PATENT DOCUMENTS

CN       108010538 A   *   5/2018    .......... G06N 3/0454
KR       20170005741 A     1/2017
(Continued)

OTHER PUBLICATIONS

Kaul, Nitin, and Nikesh Bajaj. "Audio in image steganography based on wavelet transform." International Journal of Computer Applications 79, No. 3 (2013). (Year: 2013).*

Huu, Quang Pham, Thoi Hoang Dinh, Ngoc N. Tran, Toan Pham Van, and Thanh Ta Minh. "Deep neural networks based invisible steganography for audio-into-image algorithm." In 2019 IEEE 8th Global Conference on Consumer Electronics (GCCE), pp. 423-427. IEEE, 2019. (Year: 2019).*

(Continued)

*Primary Examiner* — Carol Wang
(74) *Attorney, Agent, or Firm* — Rabin & Berdo, P.C.

(57) ABSTRACT

Disclosed herein are an apparatus and a method for generating an audio-embedded image. The apparatus for generating an audio-embedded image includes one or more processors, and execution memory for storing at least one program that is executed by the one or more processors, wherein the at least one program is configured to receive audio and an image, convert the audio into audio information having a preset image format and generate an audio-embedded image in which the audio information is embedded in the image, and discriminate the audio-embedded image using the audio information and discrimination audio information extracted from the audio-embedded image.

8 Claims, 5 Drawing Sheets

(51) Int. Cl.
*G06V 10/82* (2022.01)
*G10L 21/10* (2013.01)

(56) References Cited

U.S. PATENT DOCUMENTS

| | | | |
|---|---|---|---|
| 2011/0096775 A1 | 4/2011 | Lee et al. | |
| 2017/0013292 A1 | 1/2017 | Choi et al. | |
| 2020/0126584 A1* | 4/2020 | Huang | G10L 15/02 |

FOREIGN PATENT DOCUMENTS

| | | |
|---|---|---|
| KR | 10-1976098 B1 | 5/2019 |
| KR | 10-2099019 B1 | 4/2020 |
| KR | 10-2227624 B1 | 3/2021 |
| WO | 2019081782 A1 | 5/2019 |

OTHER PUBLICATIONS

Rao, Devendra Singh, and Pankaj Singh Parihar. "Embedding Approach of Audio Data in RGB Images Using Circle Equation." International Journal on Recent and Innovation Trends in Computing and Communication 2, No. 7 (2016): 2020-2026. (Year: 2016).*

Othman, S. E. "Hide and Seek: Embedding Audio into RGB 24-bit Color Image Sporadically Using Linked List Concepts." IOSR Journal of Computer Engineering (IOSRJCE) 4, No. 1 (2012): 37-44. (Year: 2012).*

Rully Adrian Santosa and Paul Bao, "Audio-to-image wavelet transform based audio steganography" 47th International Symposium ELMAR (Jun. 10, 2005).

* cited by examiner

APPARATUS AND METHOD FOR GENERATING AUDIO-EMBEDDED IMAGE

CROSS REFERENCE TO RELATED APPLICATIONS

This application claims the benefit of Korean Patent Application Nos. 10-2021-0023670, filed Feb. 22, 2021, and 10-2021-0064301, filed May 18, 2021, which are hereby incorporated by reference in their entireties into this application.

BACKGROUND OF THE INVENTION

1. Technical Field

The present invention relates generally to neural network technology, and more particularly to technology for generating an image containing audio information based on neural network technology.

2. Description of the Related Art

As recent Closed Circuit Televisions (CCTV) support not only image information but also audio information, research into various technologies using audio information has been actively conducted. This not only compensates for limitations of ambiguous images but also enables CCTV to be utilized in various fields, such as for the measurement of noise in urban areas, detection of accidents, and recognition of dangerous situations, and thus the value of CCTV is evaluated to be high.

However, since recording conversations using CCTV is determined to infringe on personal privacy (secret and freedom of persons), various laws dictate that recording functions cannot be used. Article 14, Clause 1 of Protection of Communications Secrets Act, stipulates "No person shall record a conversation between others that is not open to the public or listen to it through the employment of electronic or mechanical devices", thereby prohibiting the recording of sounds.

Artificial Intelligence (AI) technology has been utilized in various fields by combining big data, pattern learning technology, and other technologies. In particular, in CCTV-based image analysis technology, research into technology for improving efficiency of context awareness has been actively conducted by combining various types of information input in various manners. However, limitations on data collection due to the requirement to protect personal privacy make it more difficult to construct big learning data, thus becoming the major cause of impeding the growth of AI technology.

Meanwhile, Korean Patent No. 10-1976098, entitled "Method for Inserting secret information into video data" discloses a method for, by a transmitting terminal, inserting hidden information into video data, which extracts solution sets of an equation that contains hidden information as a constant term, encodes respective solution sets, converts bits, and thereafter modulates an information entropy value and inserts the hidden information into a video to be broadcasted over an arbitrary channel, thus inserting the hidden information into a video and enabling information to be shared in a simple manner.

SUMMARY OF THE INVENTION

Accordingly, the present invention has been made keeping in mind the above problems occurring in the prior art, and an object of the present invention is to simultaneously utilize an image and audio information using only one image by embedding the audio information in the image.

Another object of the present invention is to solve legal regulation and privacy problems by protecting audio information in such a way that the audio information is embedded in an image.

A further object of the present invention is to reduce the amount of audio data and image data, thus alleviating burdens of network usage and storage resources.

Yet another object of the present invention is to effectively utilize the technology of the present invention for image analysis and context awareness technology.

In accordance with an aspect of the present invention to accomplish the above objects, there is provided an apparatus for generating an audio-embedded image, including one or more processors; and execution memory for storing at least one program that is executed by the one or more processors, wherein the at least one program is configured to receive audio and an image, convert the audio into audio information having a preset image format and generate an audio-embedded image in which the audio information is embedded in the image, and discriminate the audio-embedded image using the audio information and discrimination audio information extracted from the audio-embedded image.

The at least one program may be configured to generate the audio-embedded image such that a result value of a first loss function, which minimizes a visual difference between the received image and the audio-embedded image using a first neural network, is minimized.

The at least one program may be configured to generate the audio-embedded image such that a result value of a second loss function, which minimizes an acoustic difference between the audio information and the discrimination audio information using the first neural network, is minimized.

The at least one program may be configured to learn the received image and the audio-embedded image such that an image feature corresponding to identical image classification, in which a result value of a third loss function between the received image and the audio-embedded image is minimized, is extracted using a second neural network.

The at least one program may be configured to learn the received audio and the audio-embedded image such that an audio feature corresponding to identical audio classification, in which a result value of a fourth loss function between the audio information and the discrimination audio information is minimized, is extracted using the second neural network.

The at least one program may be configured to minimize a sum of the result values of the first to fourth loss functions by controlling a weight of at least one of the first to fourth loss functions.

The at least one program may be configured to convert the audio information into waveform data and compare the waveform data with the received audio.

In accordance with another aspect of the present invention to accomplish the above objects, there is provided a method for generating an audio-embedded image, the method being performed by an apparatus for generating an audio-embedded image, the method including receiving audio and an image; converting the audio into audio information having a predefined image format and generating an audio-embedded image in which the audio information is embedded in the image; and discriminating the audio-embedded image using the audio information and discrimination audio information extracted from the audio-embedded image.

Generating the audio-embedded image may include generating the audio-embedded image such that a result value of a first loss function, which minimizes a visual difference between the received image and the audio-embedded image using a first neural network, is minimized.

Generating the audio-embedded image may further include generating the audio-embedded image such that a result value of a second loss function, which minimizes an acoustic difference between the audio information and the discrimination audio information using the first neural network, is minimized.

Discriminating the audio-embedded image may include learning the received image and the audio-embedded image such that an image feature corresponding to identical image classification, in which a result value of a third loss function between the received image and the audio-embedded image is minimized, is extracted using a second neural network.

Discriminating the audio-embedded image may further include learning the received audio and the audio-embedded image such that an audio feature corresponding to identical audio classification, in which a result value of a fourth loss function between the audio information and the discrimination audio information is minimized, is extracted using the second neural network.

Discriminating the audio-embedded image may further include minimizing a sum of the result values of the first to fourth loss functions by controlling a weight of at least one of the first to fourth loss functions.

Discriminating the audio-embedded image may further include converting the audio information into waveform data and comparing the waveform data with the received audio.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
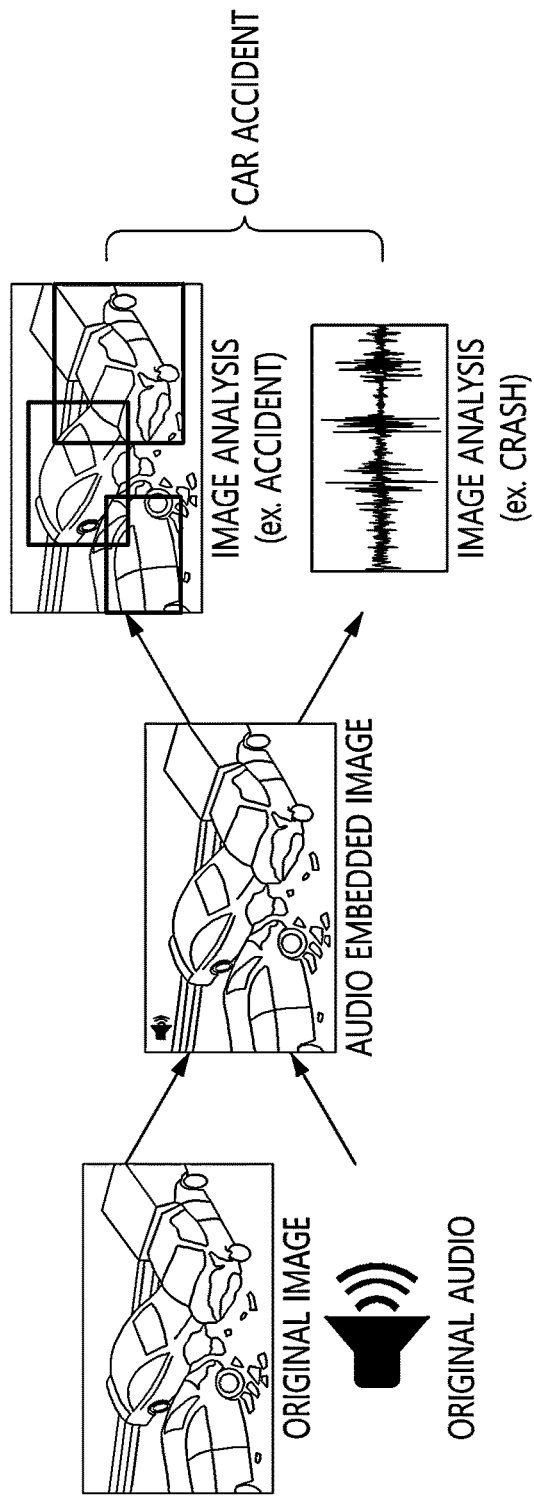
FIG. 1 is a diagram illustrating a process for generating an audio-embedded image according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

FIG. 1 is a diagram illustrating a process for generating an audio-embedded image according to an embodiment of the present invention.

Referring to FIG. 1, it can be seen that one image containing embedded audio information (also referred to as an "audio information-embedded image" or "audio-embedded image") is generated by embedding original audio information in an original image.

Here, audio analysis and image analysis may be performed on the audio-embedded image.

In detail, "accident", indicating the result of image analysis, and "crash", indicating the result of audio analysis, enable a result indicating "car accident" to be finally generated.

In the audio-embedded image having such audio, an image generated for visual utilization and the original image must be of the same visual quality, and in addition, an image containing the audio and audio extracted from the image must be provided to have high accuracy when utilized through respective analysis processes.

Figure 2:
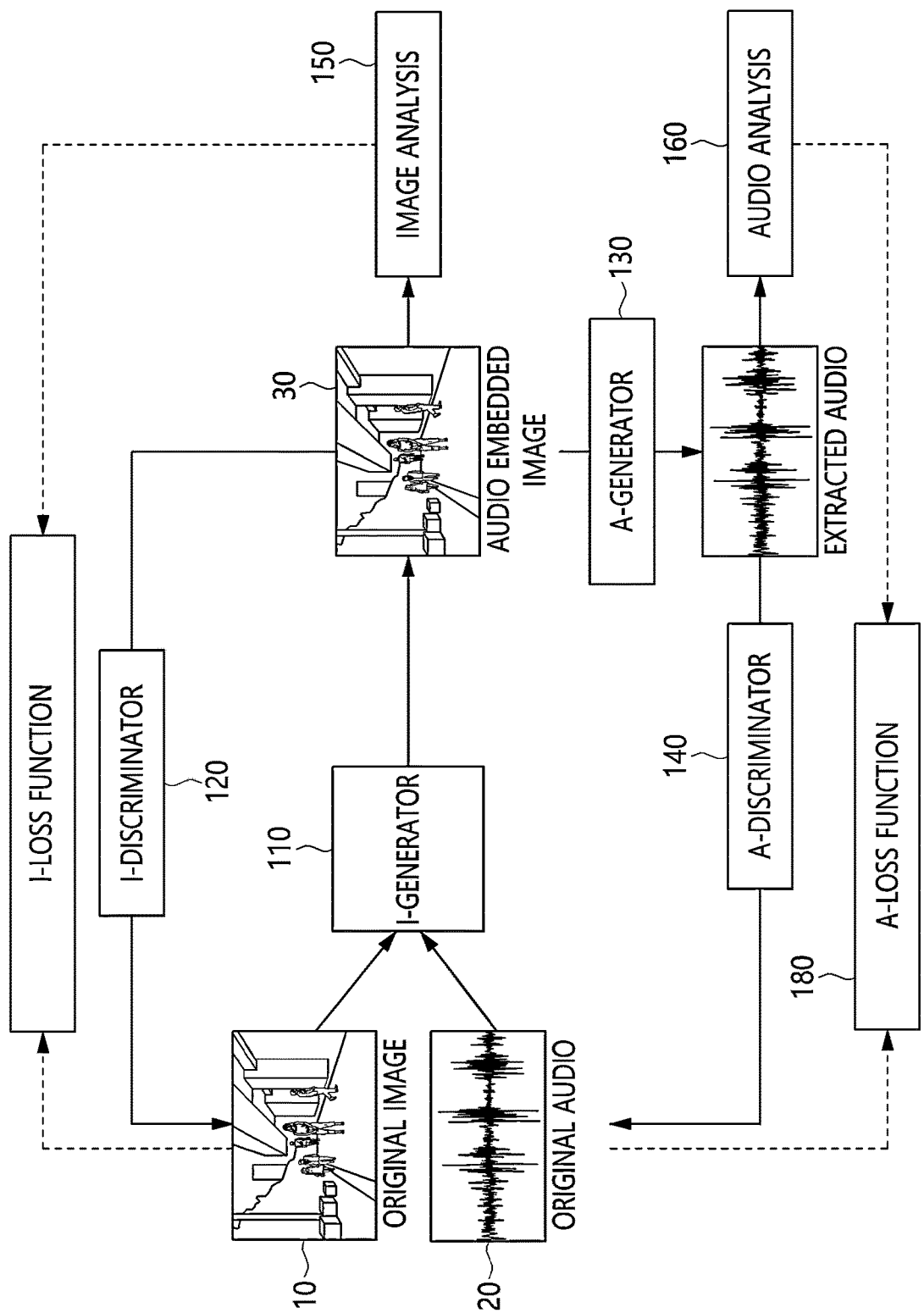
FIG. 2 is a block diagram illustrating an apparatus for generating an audio-embedded image according to an embodiment of the present invention.
Figure 3:
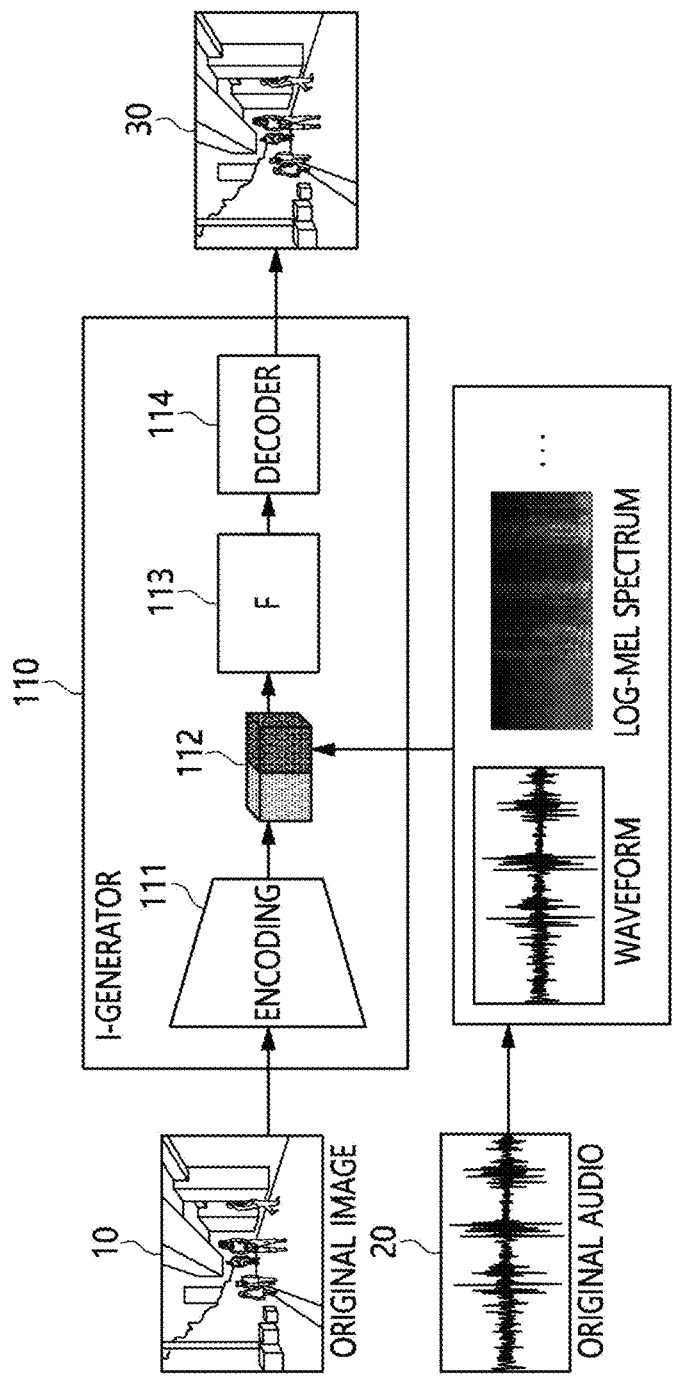
FIG. 3 is a block diagram illustrating in detail an example of the image generator illustrated in FIG. 2.

FIG. 2 is a block diagram illustrating an apparatus for generating an audio-embedded image according to an embodiment of the present invention. FIG. 3 is a block diagram illustrating in detail an example of the image generator illustrated in FIG. 2.

Referring to FIG. 2, the apparatus for generating an audio-embedded image according to the embodiment of the present invention includes an image generator (I-GENERATOR) 110, an image discriminator (I-DISCRIMINATOR) 120, an audio information extractor (A-GENERATOR) 130, an audio information discriminator (A-DISCRIMINATOR) 140, an image analyzer (IMAGE ANALYSIS) 150, and an audio analyzer (AUDIO ANALYSIS) 160.

The image generator 110 may receive audio and an image, convert the received audio into audio information having a preset image format, and then generate an audio-embedded image in which the audio information is embedded in the received image.

Here, the image generator 110 may receive N pieces of learning data, each having a pair of an image and audio to be used for learning.

Referring to FIG. 3, the image generator 110 may include an encoder 111, a data combination unit 112, a feature-learning unit 113, and a decoder 114.

The encoder 111 may receive an image 10 and reduce data of the image.

The data combination unit 112 may receive audio 20, convert the audio 20 into audio information having a preset image format, and combine the audio information having a preset image-format with the image 10.

Here, assuming that the size of the image is (N, W, H), the size of the audio information becomes (M, W, H) though a conversion operation, and the data combination unit 112 may combine the image with the audio information so that the size of the information, combined through data combination in a manner such as a stacking manner, is (N+M, W, H). This data combination may include all of various types of data combination methods including not only stacking but also data embedding.

Here, the data combination unit 112 may convert audio into an image format through a conversion process based on audio features such as not only a waveform, which is an original audio format, but also audio energy, a zero-crossing rate, Mel-Frequency Cepstrum Coefficients (MFCCs), or log mel-spectrogram.

The feature-learning unit 113 may perform a support function of improving the efficiency of the decoder by additionally learning a small amount of information, as in the case of a residual module or an attention module.

The decoder 114 may generate an audio-embedded image 30 by performing a function of reconstructing data combined with the audio information into an image.

The image discriminator 120 may discriminate (verify) whether the received image is identical to the generated audio-embedded image.

Here, the image discriminator 120 may calculate the result value of a first loss function, which minimizes a visual difference between the received image and the audio-embedded image, using a first neural network.

Here, the image generator (I-GENERATOR) 110 may generate the audio-embedded image based on the result value of the first loss function having the minimized visual difference.

Here, the image generator 110 may perform learning based on adversarial loss (based on I-Generator and I-Discriminator) of a generative neural network that is a first neural network.

The audio information extractor (A-GENERATOR) 130 may extract audio information for discrimination (i.e., discrimination audio information) from the audio-embedded image.

The audio information discriminator 140 may discriminate whether the audio information of the received audio is identical to the discrimination audio information extracted from the generated audio-embedded image.

Here, the audio information extractor 130 may extract image-format audio information that is used to generate the audio-embedded image, and the audio information discriminator 140 may compare pieces of audio information having the same format, which are used for input/output, with each other.

In an embodiment, when a log mel-spectrogram is input to the image generator 110, the audio information extractor 130 may extract a log mel-spectrogram from the audio-embedded image, and the audio information discriminator 140 may compare the input log mel-spectrogram with the extracted log mel-spectrogram.

Here, the audio information discriminator 140 may calculate the result value of a second loss function, which minimizes an acoustic difference between the audio information of the received audio and the discrimination audio information, using the first neural network.

Here, the audio information discriminator 140 may perform learning based on adversarial loss (based on A-Generator and A-Discriminator) of the generative neural network that is the first neural network.

Here, the audio information discriminator 140 may convert the audio information into waveform data, and compare the waveform data with the received audio.

Here, the image generator 110 may generate the audio-embedded image based on the result value of the second loss function having the minimized acoustic difference.

The audio-embedded image is focused on the generation of an image visually identical to the original image, whereas image analysis and audio analysis are dependent on feature information used in a neural network, and thus analytic neural network-based learning may be performed such that feature information required for unique analysis of each of video and audio can be maintained in the audio-embedded image.

The image analyzer 150 and the audio analyzer 160 may utilize the analytic neural network to correct and maintain respective feature values so that the pieces of audio information extracted from the audio-embedded image and the received image have high accuracy without causing deterioration of performance.

The image analyzer 150 may learn the received image and the audio-embedded image so that image features corresponding to the same image classification, in which the result value of a third loss function between the received image and the audio-embedded image is minimized, are extracted using the second neural network.

Here, the image analyzer 150 may perform learning based on the I-Loss function (F(IMG), F(IMG*)) of the analytic neural network that is the second neural network.

The audio analyzer 160 may discriminate (verify) the audio-embedded image using the audio information of the received audio and the discrimination audio information extracted from the audio-embedded image.

Here, the audio analyzer 160 may learn the received audio and the audio-embedded image so that audio features corresponding to the same audio classification, in which the result value of a fourth loss function between the audio information of the received audio and the discrimination audio information is minimized, are extracted using the second neural network.

Here, the audio analyzer 160 may perform learning based on the A-Loss function (F(AUD), F(AUD*)) of the analytic neural network that is the second neural network.

Here, the audio analyzer 160 may replace the results of audio analysis directly acquired from the audio-embedded image with the results of analysis of the discrimination audio information extracted by the audio information extractor 130.

The audio information extractor 130 may be operated in the state in which it is included in the audio analyzer 160, and the operation of the audio information discriminator 140 may be skipped when the discrimination audio information extracted from the audio-embedded image is intended to be utilized in audio analysis. The reason for this is that optimization through the A-Loss function includes the role of the audio information discriminator 140.

In this case, the image analyzer 150 and the audio analyzer 160 may minimize the sum (total loss) of the result values of the first to fourth loss functions by controlling the weight of at least one of the first to fourth loss functions, as represented by the following Equation (1):

$$\text{Total-Loss} = \lambda_1 GAN\text{-Loss}(I\text{-Generator}, I\text{-Discriminator}) + \\ \lambda_2 GAN\text{-Loss}(A\text{-Generator}, A\text{-Discriminator}) + \\ \lambda_3 I\text{-Loss}(F(IMG), F(IMG*)) + \lambda_4 A\text{-Loss}(AUD), F(AUD*)) \quad (1)$$

The four loss functions may be systematically learned using a parameter $\lambda$ for assigning weights between losses, and then targeted functions may be optimized and provided, but the loss functions may be provided in the form of a module which can be added or subtracted according to the circumstances.

Here, the image analyzer 150 and the audio analyzer 160 may minimize the sum of the result values (total loss) of the first loss function and the second loss function by controlling the weight of at least one of the first loss function and the second loss function.

Here, the image analyzer 150 and the audio analyzer 160 may minimize the sum of the result values (total loss) of the third loss function and the fourth loss function by controlling the weight of at least one of the third loss function and the fourth loss function.

Neural networks according to an embodiment of the present invention may include all of existing similar networks. In an embodiment, the generative neural network, which is the first neural network, may include an AutoEncoder (AE), a Variant AutoEncoder (VAE), a Generative Adversarial Network (GAN), or the like, and the analytic neural network, which is the second neural network, may be implemented using a Convolutional Neural Network (CNN), a Recurrent Neural Network (RNN), a Transformer, or the like.

Image analysis may include tasks for utilizing images for various purposes, such as image segmentation, detection, and classification.

Audio analysis may be utilized for audio tagging, sound event detection, and audio play, and thus the range thereof is not especially limited.

Figure 4:
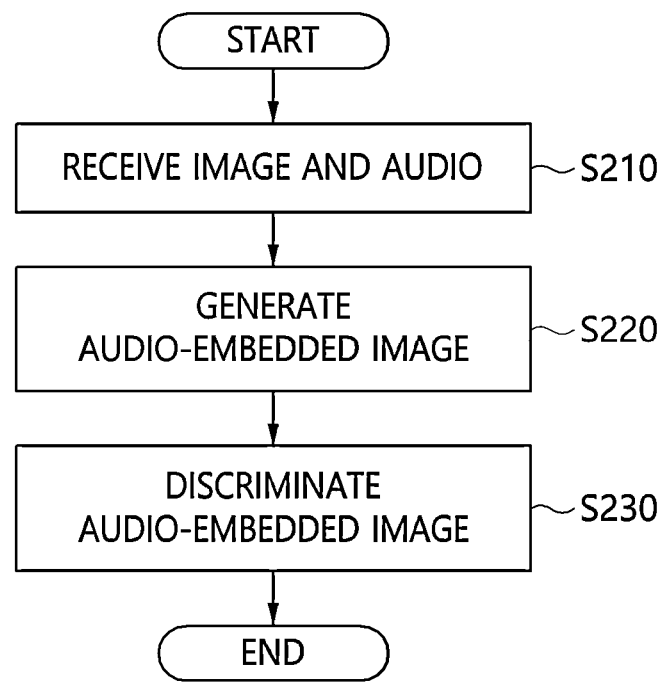
FIG. 4 is an operation flowchart of a method for generating an audio-embedded image according to an embodiment of the present invention.

FIG. 4 is an operation flowchart illustrating a method for generating an audio-embedded image according to an embodiment of the present invention.

Referring to FIG. 4, the method for generating an audio-embedded image according to the embodiment of the present invention may receive audio and an image at step S210.

That is, at step S210, N pieces of learning data, each having a pair of an image and audio to be used for learning, may be received.

Further, the method for generating an audio-embedded image according to the embodiment of the present invention may generate an audio-embedded image at step S220.

That is, at step S220, the audio may be converted into audio information having a predefined format, and an audio-embedded image in which the audio information is embedded in the image may be generated.

At step S220, an image 10 may be received, and data of the image may be reduced.

Here, at step S220, audio 20 may be received, and may be converted into audio information having a preset image format, and the audio information having the preset image-format may be combined with the image 10.

Here, at step S220, assuming that the size of the image is (N, W, H), the size of the audio information becomes (M, W, H) though a conversion operation, and the image may be combined with the audio information so that the size of the information, combined through data combination in a manner such as a stacking manner, is (N+M, W, H). This data combination may include all of various types of data combination methods including not only stacking but also data embedding.

Here, at step S220, the audio may be converted into an image format through a conversion process based on audio features such as not only a waveform, which is an original audio format, but also audio energy, a zero-crossing rate, Mel-Frequency Cepstrum Coefficients (MFCCs), or log mel-spectrogram.

Here, at step S220, a support function of improving the efficiency of the decoder may be performed by additionally learning a small amount of information, as in the case of a residual module or an attention module.

Here, at step S220, an audio-embedded image 30 may be generated by performing a function of reconstructing data combined with the audio information into an image.

Here, at step S220, whether the received image is identical to the generated audio-embedded image may be discriminated.

Here, at step S220, the result value of a first loss function, which minimizes a visual difference between the received image and the audio-embedded image, may be calculated using a first neural network.

Here, at step S220, the audio-embedded image may be generated based on the result value of the first loss function having the minimized visual difference.

Here, at step S220, learning may be performed based on adversarial loss (based on I-Generator and I-Discriminator) of a generative neural network that is a first neural network.

Here, at step S220, audio information for discrimination (i.e., discrimination audio information) may be extracted from the audio-embedded image.

Here, at step S220, whether the audio information of the received audio is identical to the discrimination audio information extracted from the generated audio-embedded image may be discriminated.

Here, at step S220, image-format audio information that is used to generate the audio-embedded image may be extracted, and pieces of audio information having the same format, which are used for input/output, may be compared with each other.

Here, at step S220, when a log mel-spectrogram is input, a log mel-spectrogram may be extracted from the audio-embedded image, and the input log mel-spectrogram may be compared with the extracted log mel-spectrogram.

Here, at step S220, the result value of a second loss function, which minimizes an acoustic difference between the audio information of the received audio and the discrimination audio information, may be calculated using the first neural network.

Here, at step S220, learning may be performed based on adversarial loss (based on A-Generator and A-Discriminator) of the generative neural network that is the first neural network.

Here, at step S220, the audio information may be converted into waveform data, and the waveform data may be compared with the received audio.

Here, at step S220, the audio-embedded image may be generated based on the result value of the second loss function having the minimized acoustic difference.

Furthermore, the method for generating an audio-embedded image according to the embodiment of the present invention may discriminate the audio-embedded image at step S230.

That is, at step S230, the audio-embedded image be discriminated using the audio information and the audio information extracted from the audio-embedded image.

Here, at step S230, an analytic neural network may be utilized to correct and maintain respective feature values so that the pieces of audio information extracted from the audio-embedded image and the received image have high accuracy without causing deterioration of performance.

Here, at step S230, the received image and the audio-embedded image may be learned so that image features corresponding to the same image classification, in which the result value of a third loss function between the received image and the audio-embedded image is minimized, are extracted using the second neural network.

Here, at step S230, learning may be performed based on the I-Loss function (F(IMG), F(IMG*)) of the analytic neural network that is the second neural network.

Here, at step S230, the received audio and the audio-embedded image may be learned so that audio features corresponding to the same audio classification, in which the result value of a fourth loss function between the audio information of the received audio and the discrimination audio information is minimized, are extracted using the second neural network.

Here, at step S230, learning may be performed based on the A-Loss function (F(AUD), F(AUD*)) of the analytic neural network that is the second neural network.

Here, at step S230, the sum (total loss) of the result values of the first to fourth loss functions may be minimized by controlling the weight of at least one of the first to fourth loss functions, as represented by Equation (1).

The four loss functions may be systematically learned using a parameter λ for assigning weights between losses, and then targeted functions may be optimized and provided, but the loss functions may be provided in the form of a module which can be added or subtracted according to the circumstances.

Here, at step S230, the sum of the result values (total loss) of the first loss function and the second loss function may be minimized by controlling the weight of at least one of the first loss function and the second loss function.

Here, at step S230, the sum of the result values (total loss) of the third loss function and the fourth loss function may be minimized by controlling the weight of at least one of the third loss function and the fourth loss function.

Here, at step S230, the audio information may be converted into waveform data, and the waveform data may be compared with the received audio.

Figure 5:
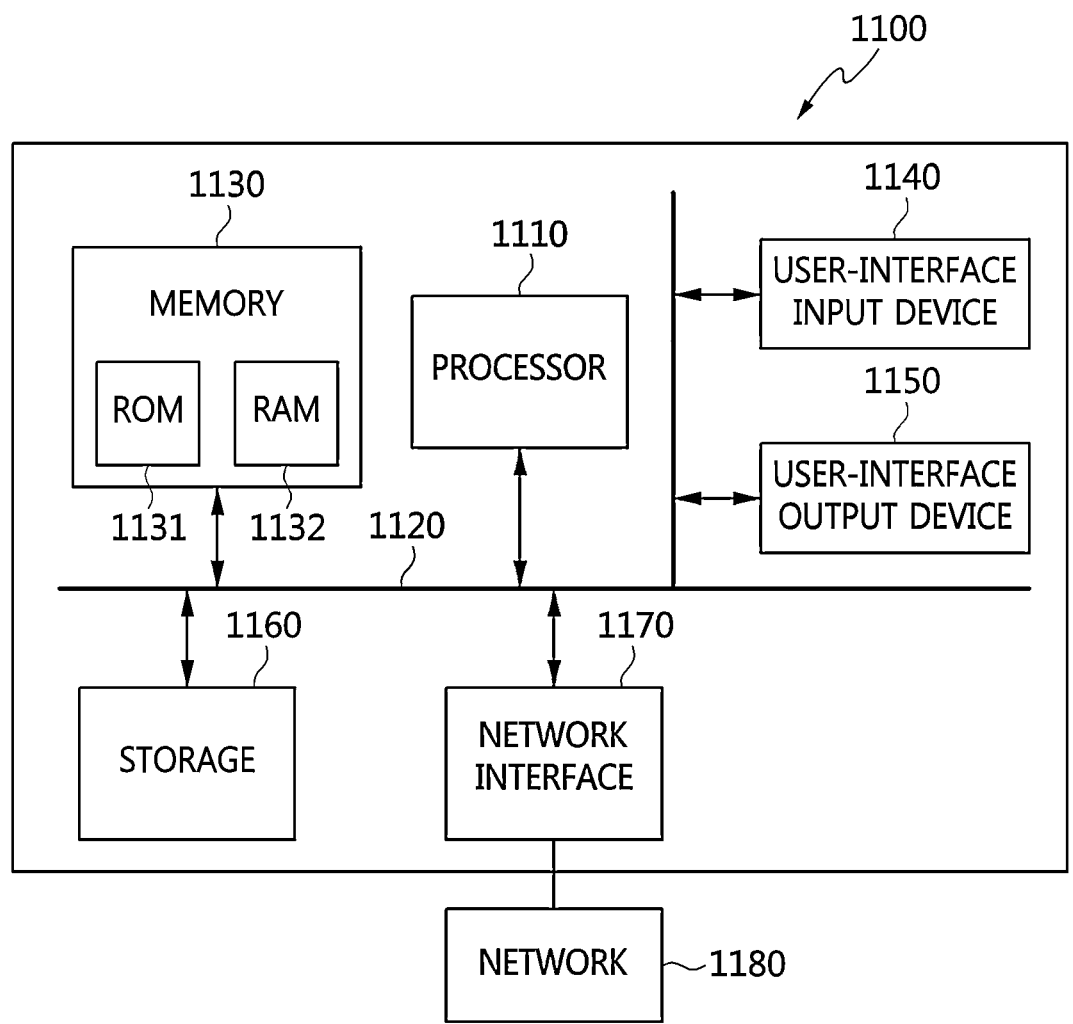
FIG. 5 is a diagram illustrating a computer system according to an embodiment of the present invention.

FIG. 5 is a diagram illustrating a computer system according to an embodiment of the present invention.

Referring to FIG. 5, an apparatus for generating an audio-embedded image according to an embodiment of the present invention may be implemented in a computer system 1100 such as a computer-readable storage medium. As illustrated in FIG. 5, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The apparatus for generating an audio-embedded image according to an embodiment of the present invention includes one or more processors 1110 and execution memory 1130 for storing at least one program that is executed by the one or more processors 1110, wherein the at least one program is configured to receive audio and an image, convert the audio into audio information having a preset image format and generate an audio-embedded image in which the audio information is embedded in the image, and discriminate the audio-embedded image using the audio information and discrimination audio information extracted from the audio-embedded image.

Here, the at least one program may be configured to generate the audio-embedded image such that a result value of a first loss function, which minimizes a visual difference between the received image and the audio-embedded image using a first neural network, is minimized.

Here, the at least one program may be configured to generate the audio-embedded image such that a result value of a second loss function, which minimizes an acoustic difference between the audio information and the discrimination audio information using the first neural network, is minimized.

Here, the at least one program may be configured to learn the received image and the audio-embedded image such that an image feature corresponding to identical image classification, in which a result value of a third loss function between the received image and the audio-embedded image is minimized, is extracted using a second neural network.

Here, the at least one program may be configured to learn the received audio and the audio-embedded image such that an audio feature corresponding to identical audio classification, in which a result value of a fourth loss function between the audio information and the discrimination audio information is minimized, is extracted using the second neural network.

Here, the at least one program may be configured to minimize a sum of the result values of the first to fourth loss functions by controlling a weight of at least one of the first to fourth loss functions.

Here, the at least one program may be configured to convert the audio information into waveform data and compare the waveform data with the received audio.

The apparatus and method for generating an audio-embedded image according to embodiments of the present invention may more effectively utilize audio information embedded in an image in situations in which privacy is required, such as for audio containing human speech.

Linguistic audio based on CCTV is of limited usefulness because recording is not permitted according to the Protection of Communication Secrets Act. An image or a video including speech (voice), as in the case of the present invention, may be utilized in various types of research involving audio while the problem of speech exposure may be solved.

In particular, the apparatus and method for generating an audio-embedded image according to embodiments of the present invention may set audio information so that converted audio information cannot be restored into an original audio file, and thus the apparatus and method may offer a solution to legal problems related to illegality of restoration of the audio information into the original audio file.

The present invention may simultaneously utilize an image and audio information using only one image by embedding the audio information in the image.

Further, the present invention may solve legal regulation and privacy problems by protecting audio information in such a way that the audio information is embedded in an image.

Furthermore, the present invention may reduce the amount of audio data and image data, thus alleviating burdens of network usage and storage resources.

Furthermore, the present invention may effectively utilize the technology of the present invention for image analysis and context awareness technology.

As described above, in the apparatus and method for generating an audio-embedded image according to the present invention, the configurations and schemes in the above-described embodiments are not limitedly applied, and some or all of the above embodiments can be selectively combined and configured such that various modifications are possible.

What is claimed is:

1. An apparatus for generating an audio-embedded image, comprising:
one or more processors; and
an execution memory for storing at least one program that is executed by the one or more processors,
wherein the at least one program is configured to:
receive audio and an image,
convert the audio into audio information having a preset image format,
generate the audio-embedded image in which the audio information is embedded in the image,
discriminate the audio-embedded image using the audio information and discrimination audio information extracted from the audio-embedded image,
generate the audio-embedded image such that a result value of a first loss function, which minimizes a visual difference between the received image and the audio-embedded image using a first neural network, is minimized,
generate the audio-embedded image such that a result value of a second loss function, which minimizes an acoustic difference between the audio information and the discrimination audio information using the first neural network, is minimized, and
learn the received image and the audio-embedded image such that an image feature corresponding to identical image classification, in which a result value of a third loss function between the received image and the audio-embedded image is minimized, is extracted using a second neural network.

2. The apparatus of claim 1, wherein the at least one program is configured to learn the received audio and the audio-embedded image such that an audio feature corresponding to identical audio classification, in which a result value of a fourth loss function between the audio information and the discrimination audio information is minimized, is extracted using the second neural network.

3. The apparatus of claim 2, wherein the at least one program is configured to minimize a sum of the result values of the first to fourth loss functions by controlling a weight of at least one of the first to fourth loss functions.

4. The apparatus of claim 3, wherein the at least one program is configured to convert the audio information into waveform data and compare the waveform data with the received audio.

5. A method for generating an audio-embedded image, the method being performed by an apparatus for generating the audio-embedded image, the method comprising:
receiving audio and an image;
converting the audio into audio information having a predefined image format;
generating the audio-embedded image in which the audio information is embedded in the image; and
discriminating the audio-embedded image using the audio information and discrimination audio information extracted from the audio-embedded image;
wherein generating the audio-embedded image comprises:
generating the audio-embedded image such that a result value of a first loss function, which minimizes a visual difference between the received image and the audio-embedded image using a first neural network, is minimized, and
generating the audio-embedded image such that a result value of a second loss function, which minimizes an acoustic difference between the audio information and the discrimination audio information using the first neural network, is minimized, and
wherein discriminating the audio-embedded image comprises:
learning the received image and the audio-embedded image such that an image feature corresponding to identical image classification, in which a result value of a third loss function between the received image and the audio-embedded image is minimized, is extracted using a second neural network.

6. The method of claim 5, wherein discriminating the audio-embedded image further comprises:
learning the received audio and the audio-embedded image such that an audio feature corresponding to identical audio classification, in which a result value of a fourth loss function between the audio information and the discrimination audio information is minimized, is extracted using the second neural network.

7. The method of claim 6, wherein discriminating the audio-embedded image further comprises:
minimizing a sum of the result values of the first to fourth loss functions by controlling a weight of at least one of the first to fourth loss functions.

8. The method of claim 7, wherein discriminating the audio-embedded image further comprises:
converting the audio information into waveform data and comparing the waveform data with the received audio.

* * * * *